United States Patent
Labiste (10) Patent No.: US 12,483,166 B2
(45) Date of Patent: Nov. 25, 2025

(54) DEVICE FOR DETERMINING THE ANGULAR POSITION OF A ROTOR OF A ROTATING ELECTRIC MACHINE

(71) Applicant: VALEO EQUIPEMENTS ELECTRIQUES MOTEUR, Creteil (FR)

(72) Inventor: Laurent Labiste, Creteil (FR)

(73) Assignee: VALEO EQUIPEMENTS ELECTRIQUES MOTEUR, Creteil (FR)

(*) Notice: Subject to any disclaimer, the term of this patent is extended or adjusted under 35 U.S.C. 154(b) by 189 days.

(21) Appl. No.: 18/245,442

(22) PCT Filed: Oct. 4, 2021

(86) PCT No.: PCT/EP2021/077318
§ 371 (c)(1),
(2) Date: Mar. 15, 2023

(87) PCT Pub. No.: WO2022/084017
PCT Pub. Date: Apr. 28, 2022

(65) Prior Publication Data
US 2023/0336100 A1 Oct. 19, 2023

(30) Foreign Application Priority Data
Oct. 19, 2020 (FR) .................................. 2010685

(51) Int. Cl.
*H02P 1/00* (2006.01)
*H02P 9/00* (2006.01)

(52) U.S. Cl.
CPC .................................. *H02P 9/009* (2013.01)

(58) Field of Classification Search
CPC ....................................................... H02P 9/009
See application file for complete search history.

(56) References Cited

U.S. PATENT DOCUMENTS

2002/0149335 A1* 10/2002 Imai ...................... H02P 6/185
318/494

FOREIGN PATENT DOCUMENTS

| WO | WO 99/18653 A1 | 4/1999 |
| WO | WO 03/021123 A1 | 3/2003 |

OTHER PUBLICATIONS

International Search Report mailed on Jan. 17, 2022 in PCT/EP2021/077318 filed on Oct. 4, 2021 (citing references 15, 16, 24, 25 therein), 3 pages.

(Continued)

*Primary Examiner* — Karen Masih
(74) *Attorney, Agent, or Firm* — Oblon, McClelland, Maier & Neustadt, L.L.P.

(57) ABSTRACT

A device for determining the angular position of a rotor of a rotary electric machine on the basis of signals delivered by a plurality of position sensors. The device includes a circuit that applies a control loop to estimate the position of the rotor, and that delivers as output a signal representative of the position of the rotor. Also included is at least one circuit for performing dynamic processing of an odd-order harmonic of a signal resulting from the signals delivered by the position sensors.

20 Claims, 5 Drawing Sheets (56) References Cited

OTHER PUBLICATIONS

Ertan H. Bulent, et al. "Implementation issues of real time position estimation for induction motors using rotor slot harmonics", 4th International Conference on Power Engineering, Energy and Electrical Drives, IEEE, May 2013, pp. 1826-1832.
Aditya N. Ghule, et al. "High Frequency Injection Based Rotor Position Self-Sensing for Synchronous Electrostatic Machines" 2019 IEEE Energy Conversion Congress and Exposition (ECCE), IEEE, Sep. 2019, pp. 804-811.
European Office Action issued Feb. 4, 2025, in corresponding European Patent Application No. 21786912.2, 4 pages.

* cited by examiner

DEVICE FOR DETERMINING THE ANGULAR POSITION OF A ROTOR OF A ROTATING ELECTRIC MACHINE

BACKGROUND OF THE INVENTION

Field of the Invention

The present invention relates to a device for determining the angular position of a rotor of a rotary electric machine and to an assembly comprising such a determining device and such a rotary electric machine.

The electric machine is, for example, an alternator or a starter-alternator powered by a nominal voltage of 12 V or 48 V, or even more.

This electric machine may be integrated into a hybrid or purely electric vehicle, an automobile for example.

Description of the Related Art

In order to control this electric machine it is necessary to know the angular position of the rotor of the machine. To do this, it is known in the case of a three-phase synchronous machine to use a plurality of Hall-effect sensors the signals of which are processed, after application of a mathematical transformation such as a Clarke or Concordia transform, by a circuit for estimating the position of the rotor, for example via a control loop. This circuit delivers as output a signal representative of this position of the rotor. This measurement may then for example be used to control the inverter/rectifier placed between the stator of this electric machine and the unit used on-board the vehicle to store electrical energy, which unit is especially a battery.

The accuracy of the position obtained as output from the circuit for estimating the position of the rotor largely depends on the accuracy of the signals delivered by the sensors. The magnetic targets of these sensors have magnetization profiles that may generate substantial odd-order harmonics in the signal delivered by these sensors. The presence of certain of these odd-order harmonics in the input of the circuit for estimating the position of the rotor may affect the accuracy of the angular position of the rotor. Control of the machine is thus impacted.

BRIEF SUMMARY OF THE INVENTION

There is a need to overcome the aforementioned drawbacks, by robustly improving the quality of the signals received by the circuit for estimating the position of the rotor.

One subject addressed by the invention is that of meeting this need and this is done, according to one of the aspects of the invention, using a device for determining the angular position of a rotor of a rotary electric machine on the basis of signals delivered by a plurality of position sensors, the device comprising:

a circuit for estimating the position of the rotor, especially via application of a control loop, this circuit delivering as output a signal representative of the position of the rotor, and at least one circuit for performing dynamic processing of an odd-order harmonic of a signal resulting from the signals delivered by the position sensors, this circuit for performing dynamic processing receiving as input:
the signal resulting from the signals delivered by the position sensors, and
the signal representative of the position of the rotor this circuit for performing dynamic processing being configured to:
generate at least two signals representative of the phase and of the amplitude of the odd-order harmonic for which it is desired to compensate, via:
synchronous demodulation of the signal resulting from the signals delivered by the position sensors by a reference signal at said harmonic and in phase with the signal representative of the position of the rotor, this reference signal being generated on the basis of the signal representative of the position of the rotor, then
low-pass filtering,
reconstruct a signal at said harmonic on the basis of the reference signal at said harmonic in phase with the signal representative of the position of the rotor and using each signal representative of phase and amplitude generated beforehand, especially via synchronous modulation, and
compensate for said harmonic by subtracting from the signal resulting from the signals delivered by the position sensors the signal at said harmonic thus reconstructed.

According to the invention, an odd-order harmonic present in the signal resulting from the signals delivered by the position sensors is compensated for dynamically, so that the circuit for estimating the position of the rotor receives as input a signal in which the harmonic in question has been compensated for or greatly reduced in amplitude. This improves the accuracy of the signal representative of the position of the rotor, and consequently of any other control mechanism using this signal representative of the position of the rotor.

This improvement is obtained using a simple solution, which is implemented in the determining device upstream of the circuit applying the control loop. Moreover, this solution has the advantage of not requiring over-sampling, and of not requiring additional end-of-line calibration. Furthermore, this solution operates dynamically, and not merely in the steady state—it has the advantage of being able to adapt to variation over time in this harmonic, regardless of whether this variation is due to temper-ature or aging.

Within the context of the present application, the signal is said to be at the harmonic in question when its frequency is the same as that of the harmonic in question.

The signal representative of the position of the rotor is, for example, a value of an angle with respect to a reference position. It may be a question of the angle characterizing the electrical position or the angle characterizing the mechanical position of the rotor of the electric machine.

The circuit for performing dynamic processing is placed upstream of the circuit for estimating the position of the rotor, especially via application of a control loop. In other words, the circuit for performing dynamic processing may deliver as output an input of the circuit for estimating the position of the rotor. The signal resulting from the signals delivered by the position sensors, which signal is received as input by the circuit for performing dynamic processing, may have a cosine component and a sine component, the signals delivered by the sensors for example having been processed by a circuit configured to apply to said signal a mathematical transformation allowing a system, especially a three-phase system, to be modelled as a two-phase system. This transformation uses, for example, a Clarke or Concordia matrix.

In the case where the signal resulting from the signals delivered by the position sensors contains such components, the synchronous demodulation may consist in performing the following four demodulations:
  the cosine component of the signal resulting from the signals delivered by the sensors by the cosine component of the reference signal at said harmonic and in phase with the signal representative of the position of the rotor,
  the cosine component of the signal resulting from the signals delivered by the sensors by the sine component of the reference signal at said harmonic and in phase with the signal representative of the position of the rotor,
  the sine component of the signal resulting from the signals delivered by the sensors by the sine component of the reference signal at said harmonic and in phase with the signal representative of the position of the rotor, and
  the sine component of the signal resulting from the signals delivered by the sensors by the cosine component of the reference signal at said harmonic and in phase with the signal representative of the position of the rotor.

These four demodulations are for example synchronous demodulations.

The signals representative of the phase and of the amplitude of the odd-order harmonic for which it is desired to compensate may be generated by applying a first low-pass filter to the linear combination of two results of the four aforementioned demodulations and by applying a second low-pass filter to the linear combination of the other two results of the four aforementioned demodulations, the first and second low-pass filters especially being identical. The choice of the cut-off frequency of the first and second low-pass filters may allow the spectral domain around the harmonic for which it is desired to compensate to be defined. Depending on the bandwidth chosen, it is thus possible to process not only the odd-order harmonic in question as a monochromatic frequency, but also a relatively wide spectral zone around this harmonic.

More precisely, the first low-pass filter may process the linear combination of:
  the demodulation of the cosine component of the signal resulting from the signals delivered by the sensors by the cosine component of the reference signal at said harmonic and in phase with the signal representative of the position of the rotor, and
  the demodulation of the sine component of the signal resulting from the signals delivered by the sensors by the sine component of the reference signal at said harmonic and in phase with the signal representative of the position of the rotor,
and the second low-pass filter may process the linear combination of:
  the demodulation of the cosine component of the signal resulting from the signals delivered by the sensors by the sine component of the reference signal at said harmonic and in phase with the signal representative of the position of the rotor, and
  the demodulation of the sine component of the signal resulting from the signals delivered by the sensors by the cosine component of the reference signal at said harmonic and in phase with the signal representative of the position of the rotor.

The linear combination performed upstream of each of the first and second low-pass filters may be an addition or a subtraction, depending on the order of the odd harmonic for which it is desired to compensate. Each low-pass filter is for example a second-order filter. It may be a question of a second-order recursive filter, but other types of filters are possible. The cut-off frequency of each of the first and second low-pass filters is for example 50 Hz. However, the invention is not limited to a cut-off frequency of such a value or to the use of a set cut-off frequency, the latter possibly where appropriate varying as a function of the speed of the rotor.

The invention is not limited to the use of two low-pass filters in this step of generating signals representative of the phase and of the amplitude of the odd-order harmonic for which it is desired to compensate. For example, there may be as many low-pass filters as there are demodulations, each of these low-pass filters being assigned the result of one demodulation. Four low-pass filters, which for example are all identical and of order 2, may thus be used, and the first signal representative of the phase and of the amplitude of the odd-order harmonic for which it is desired to compensate results from a linear combination of the output of two of these low-pass filters whereas the second signal representative of the phase and of the amplitude of the odd-order harmonic for which it is desired to compensate results from a linear combination of the output of other two low-pass filters.

The invention is in addition not limited to two signals representative of the phase and of the amplitude of the odd-order harmonic for which it is desired to compensate. It is also possible to apply a low-pass filter to each demodulation and to use the output of each of these low-pass filters as a signal representative of the phase and of the amplitude of the odd-order harmonic for which it is desired to compensate, in which case four signals representative of the phase and of the amplitude of the odd-order harmonic for which it is desired to compensate are generated.

In all the foregoing, and when only two signals representative of the phase and of the odd-order harmonic for which it is desired to compensate are generated, reconstructing a signal at said harmonic may comprise the step of performing the following four modulations:
  the cosine component of the reference signal at said harmonic and in phase with the signal representative of the position of the rotor by the first signal representative of the phase and of the amplitude of the odd-order harmonic for which it is desired to compensate,
  the sine component of the reference signal at said harmonic and in phase with the signal representative of the position of the rotor by the first signal representative of the phase and of the amplitude of the odd-order harmonic for which it is desired to compensate,
  the sine component of the reference signal at said harmonic and in phase with the signal representative of the position of the rotor by the second signal representative of the phase and of the amplitude of the odd-order harmonic for which it is desired to compensate, and
  the cosine component of the reference signal at said harmonic and in phase with the signal representative of the position of the rotor by the second signal representative of the phase and of the amplitude of the odd-order harmonic for which it is desired to compensate.

In the case where four signals representative of the phase and of the amplitude of the odd-order harmonic for which it is desired to compensate are generated, reconstruction may be carried out by modulating the sine component of the reference signal at said harmonic and in phase with the signal representative of the position of the rotor by two of these four representative signals, and by modulating the cosine component of the reference signal at said harmonic and in phase with the signal representative of the position of the rotor by the two remaining representative signals.

Each of these modulations is for example a synchronous modulation.

Reconstructing the signal at said harmonic may further comprise the step of obtaining a first linear combination of the result of two of the four aforementioned modulations and a second linear combination of the result of the other two of the four aforementioned modulations. Similarly to what was mentioned in relation to the step of generating signals representative of the phase and of the amplitude of the harmonic for which it is desired to compensate, each aforementioned linear combination may be an addition or a subtraction, depending on the order of the harmonic for which it is desired to compensate.

More precisely, the first linear combination may be a linear combination of:
the modulation of the sine component of the reference signal at said harmonic and in phase with the signal representative of the position of the rotor by the first signal representative of the phase and of the amplitude of the harmonic for which it is desired to compensate, and
the modulation of the cosine component of the reference signal at said harmonic and in phase with the signal representative of the position of the rotor by the second signal representative of the phase and of the amplitude of the harmonic for which it is desired to compensate, and the second linear combination may be a linear combination of:
the modulation of the sine component of the reference signal at said harmonic and in phase with the signal representative of the position of the rotor by the second signal representative of the phase and of the amplitude of the harmonic for which it is desired to compensate, and
the modulation of the cosine component of the reference signal at said harmonic and in phase with the signal representative of the position of the rotor by the first signal representative of the phase and of the amplitude of the harmonic for which it is desired to compensate.

Said harmonic may be compensated for by subtracting from the cosine component of the signal resulting from the signals delivered by the position sensors one of the first and second linear combinations, especially the second linear combination, and by subtracting from the sine component of the signal resulting from the signals delivered by the position sensors the other of the first and second linear combinations, especially the first linear combination. After these subtractions, these two components may be recombined to form the output signal of the circuit for performing dynamic processing.

In a particular example, the circuit for performing dynamic processing of the odd-order harmonic may further comprise at least one storage unit for storing values of the signals representative of the phase and of the amplitude of the odd-order harmonic for which it is desired to compensate and, when the speed of rotation of the rotor of the electric machine passes into a predefined range of values, the representative signals are no longer used to reconstruct the signal at said harmonic, this reconstruction being carried out using the values of these representative signals stored in the storage unit before the speed of the rotor passes into said range of values. The predefined range of values is for example centered on a speed at which the odd-order harmonic for which it is desired to compensate is likely to alias the fundamental of the signal resulting from the signals delivered by the position sensors. In the absence of the aforementioned interruption, the circuit for performing dynamic processing would compensate not only for said odd-order harmonic, but also for the fundamental, and this would greatly decrease the accuracy of the circuit applying the control loop. This predefined range of speeds is for example centered on a high speed depending, inter alia, on the number of pairs of poles of the machine—it is for example 16500 rpm for a machine with six pairs of poles and a sampling frequency of 10 KHz.

The odd-order harmonic may be compensated for continuously, as described above. As a variant, the odd-order harmonic is compensated for by the circuit for performing dynamic processing only above a threshold speed of rotation of the rotor of the electric machine, and for example above a minimum speed of rotation of the rotor. Below this minimum speed of rotation, which is for example 100, 200, 300, 400, 500, 600 or 700 rpm, no compensation is then made for said odd-order harmonic according to this variant.

When such a threshold speed of rotation exists, the circuit for performing dynamic processing may have two operating ranges. A first operating range corresponds to speeds below the threshold speed and is characterized by the non-compensation for the odd-order harmonic in question. The operation of the circuit is for example neutralized by applying a zero gain to the aforementioned first and second linear combinations. The second operating range corresponds to speeds above the threshold value. In this second range, the gain applied to the aforementioned first and second linear combinations may be equal to 1. A transition may be implemented on passage from the first to the second operating mode and, during this transition, the value of the gain applied to the first and second linear combinations may pass gradually or in increments from 0 to 1. This transition is for example obtained by applying a low-pass filter to a speed-threshold-detection signal, this filter for example being a first-order filter.

The harmonic compensated for by the circuit for performing dynamic processing is for example the harmonic of order 5, or the harmonic of order 7, or the harmonic of order 11. Where appropriate, the device may comprise at least two circuits for performing dynamic processing placed in series, one of these circuits compensating for one given odd-order harmonic and the other harmonic circuit compensating for another given odd-order harmonic. For example, one circuit processes the harmonic of order 5 and another circuit processes the harmonic of order 7. Where appropriate, another additional circuit processes the harmonic of order 11.

Where appropriate, the device further comprises a circuit for performing dynamic normalization by the amplitude of the first harmonic of each signal generated by a position sensor, such as described in the patent application filed by the Applicant in France on Dec. 20, 2019 under the number 19 15288.

Another subject of the invention, according to another of its aspects, is an assembly comprising:
a rotary electric machine for driving a hybrid or electric vehicle, and
a device for controlling this electric machine, comprising a determining device such as defined above.

The rotary electric machine is for example a synchronous machine, for example a three-phase synchronous machine or a synchronous machine the stator winding of which defines a dual three-phase system. The stator winding is for example formed by wires, or by conductive bars that are connected to one another.

In all of the above, the rotor may be a claw-pole rotor. This rotor then comprises first and second interleaved claw poles, the first claw pole defining a series of claws with an overall trapezoidal shape, each claw extending axially toward the second claw pole, the second claw pole defining a series of claws with an overall trapezoidal shape, each claw extending axially toward the first claw pole. For the rotor, a permanent magnet may be accommodated between two circumferentially consecutive claws.

As a variant, the rotor may be a rotor other than a claw-pole rotor, for example a rotor comprising a stack of laminations or a squirrel-cage rotor.

In all of the above, the rotor may comprise any number of pairs of poles, for example six or eight pairs of poles.

In all of the above, the electric machine may comprise a circuit for cooling the stator through which a fluid such as air or liquid flows. This liquid may be water or oil.

The rotor may be cooled by the same cooling circuit or by another cooling circuit through which air or a liquid such as water or oil flows.

The rotary electric machine may have a nominal electric power of 4 kW, 8 kW, 15 KW, 25 kW or more.

This rotary electric machine may be electrically powered by a unit for storing electrical energy via an inverter/rectifier of the assembly, this inverter/rectifier making it possible, depending on whether the electric machine is operating as a motor or as a generator, to deliver power to an on-board network of the vehicle or to receive power from this network.

The nominal voltage of the unit for storing electrical energy may be 12 V, 48 V or have another value, for example another value higher than 300 V.

The rotary electric machine may further comprise a pulley or any other means of connection to the rest of the powertrain of the vehicle. The electric machine is for example connected, especially via a belt, to the crankshaft of the internal combustion engine of the vehicle. As a variant, the electric machine is connected to the powertrain in other locations, for example at the input of the gearbox with regard to the torque delivered to the wheels of the vehicle, at the output of the gearbox with regard to the torque delivered to the wheels of the vehicle, in the gearbox with regard to the torque delivered to the wheels of the vehicle, or even on the front axle assembly or the rear axle assembly of this powertrain.

The rotary electric machine is not necessarily a synchronous machine, it may be an asynchronous machine.

Another subject of the invention, according to another of its aspects, is a method for determining the angular position of a rotor of a rotary electric machine on the basis of signals delivered by a plurality of position sensors, wherein a determining device such as defined above is used.

All or some of what was mentioned above also applies to this other aspect of the invention.

This determining method is for example integrated into a method for controlling the electric machine, in which method the angular position of the rotor determined as above is used to control motor torque and/or the current of the unit for storing electrical energy.

BRIEF DESCRIPTION OF THE SEVERAL VIEWS OF THE DRAWINGS

The invention will possibly be better understood on reading the following description of one non-limiting example of implementation thereof, and on examining the appended drawings, in which.

DETAILED DESCRIPTION OF THE INVENTION

Figure 1:
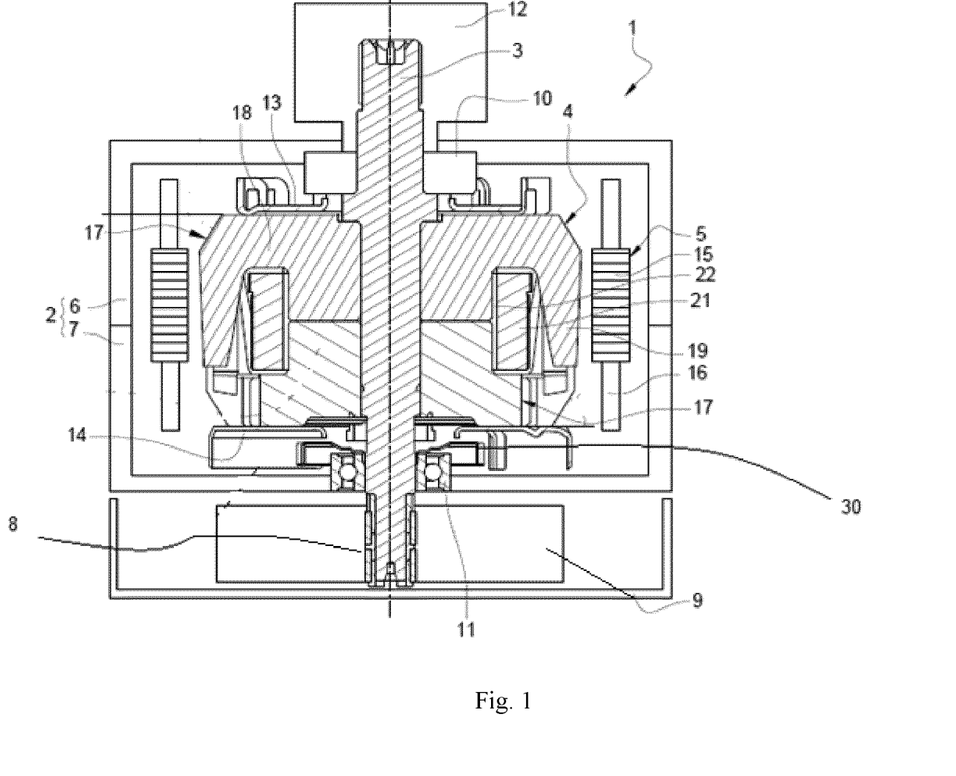
FIG. 1 schematically shows in axial cross section one example of a rotary electric machine to which the invention may be applied.

FIG. 1 shows a polyphase rotary electric machine 1, especially for a motor vehicle, and to which the invention may be applied.

This rotary electric machine may form an alternator or a starter-alternator of the vehicle. This rotary electric machine may be powered, via power electronics 9 comprising an inverter/rectifier, by a battery the nominal voltage of which is 12 V or 48 V or of a value above 300 V, for example.

The rotary electric machine 1 comprises a case 2. Inside this case 2, it further comprises a shaft 3, a rotor 4 that rotates as one with the shaft 3, and a stator 5 encircling the rotor 4. The rotational movement of the rotor 4 takes place about an axis X. In this example, the case 2 comprises a front end shield 6 and a rear end shield 7 that are joined together. These end shields 6, 7 are hollow in shape and each bears, centrally, a respective ball bearing 10, 11 allowing the shaft 3 to be rotatably mounted.

A pulley 12 is, in the example in question, fastened to a front end of the shaft 3, beside the front end shield 6, for example using a nut that bears against the bottom of the cavity of this pulley. This pulley 12 makes it possible to transmit the rotational movement to the shaft 3 and it may be connected, via a belt, to the crankshaft of the internal combustion engine of the vehicle.

The rear end of the shaft 3 here bears slip rings belonging to a commutator and connected by wire connections to the winding. Brushes belonging to a brush holder 8 are placed so as to rub against the slip rings.

The front end shield 6 and the rear end shield 7 may further comprise substantially lateral apertures for the passage of air, allowing the rotary electric machine to be cooled by an airflow generated by rotation of a front fan 13 on the front dorsal face of the rotor 4, i.e. beside the front end shield 6, and of a rear fan 14 on the rear dorsal face of the rotor, i.e. beside the rear end shield 7.

In this example of an embodiment, the stator 5 comprises a body 15 taking the form of a stack of laminations, the stack containing slots, for example semi-closed or semi-open slots, the slots being equipped with slot insulator, enabling installation of the polyphase electrical winding of the stator. Each phase comprises a winding 16 passing through the slots of the body 15 and forming, with all the phases, a front end winding and a rear end winding on either side of the body of the stator. The windings 16 are for example obtained using a continuous wire covered with enamel, or using bar-shaped conductive elements such as pins connected to one another. The electric winding of the stator is for example three-phase, a star or delta configuration then being employed, the outputs of which are connected to the power electronics 9.

The rotor 4 of FIG. 1 is a claw-pole rotor. It comprises two claw poles 17. The first claw pole 17 faces the power electronics 9, whereas the second claw pole 17 faces the pulley 12.

Each of the claw poles 17 comprises a bottom 18 extending radially on either side of the axis X, the pole defining a series of claws 19 of trapezoidal overall shape. Each claw of a claw pole 17 extends axially in the direction of the other claw pole from a base located on the radially outer periphery of the bottom 18.

The rotor 4 further comprises, between the radially inner portions 20 and the claws 19, a coil wound on a coil insulator 22.

The rotor 4 may also comprise permanent magnets (not shown) interposed between two neighboring claws 19 on the outer periphery of the rotor. As a variant, the rotor 4 may be devoid of such permanent magnets.

Figure 2:
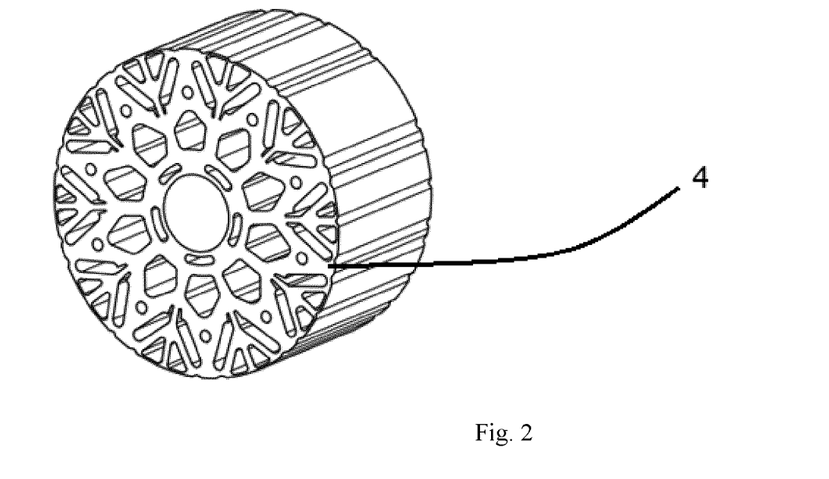
FIG. 2 shows in elevation a type of rotor different from that of FIG. 1

The rotor 4 may even be different from that shown in FIG. 1, being for example formed by a stack of laminations, as shown in FIG. 2.

Any number of pairs of poles, for example six or eight, may be defined by the rotor 4.

The machine further comprises sensors 20 for measuring the position of the rotor 4, for example three Hall-effect sensors grouped together in the same plastic housing. These sensors are for example positioned in the rear end shield 7 of the machine, and they interact with a magnetic target that rotates as one with the rotor.

The measurements delivered by these sensors 20 are used by the device 100 for determining the angular position of the rotor 4, which will now be described with reference to FIGS. 3 to 5.

In a known manner, the device 100 comprises a circuit 101 for discretizing the signals acquired by each position sensor 20. This circuit 101 for example performs a sampler/hold function then a mathematical transformation allowing the system, which in the example is a three-phase system, to be modelled as a two-phase system. This transformation for example uses a Clarke or Concordia matrix. Other transformations may be used when the number of position sensors is different from three.

The output signal of this circuit 101 is delivered to a circuit 102 for performing dynamic processing of an odd-order harmonic of this signal. It is for example a question of the harmonic of order 5, or of the harmonic of order 7 or of the harmonic of order 11. This circuit 102 will be described below.

The signals output by the circuit 102 are input into a circuit 103 that delivers as output a signal representative of the position of the rotor 4, which represents this position via an angle θ measured with respect to a reference position of this rotor, and the speed of rotation of the rotor, which corresponds to the time derivative of this angle. In the described example, this angle corresponds to the electrical angle characterizing the position of rotor 4. This circuit 103 here employs a control loop to control the position of the rotor 4.

The circuit 103 is for example identical to the one described in the aforementioned French patent application filed under number 19 15288.

Figure 3:
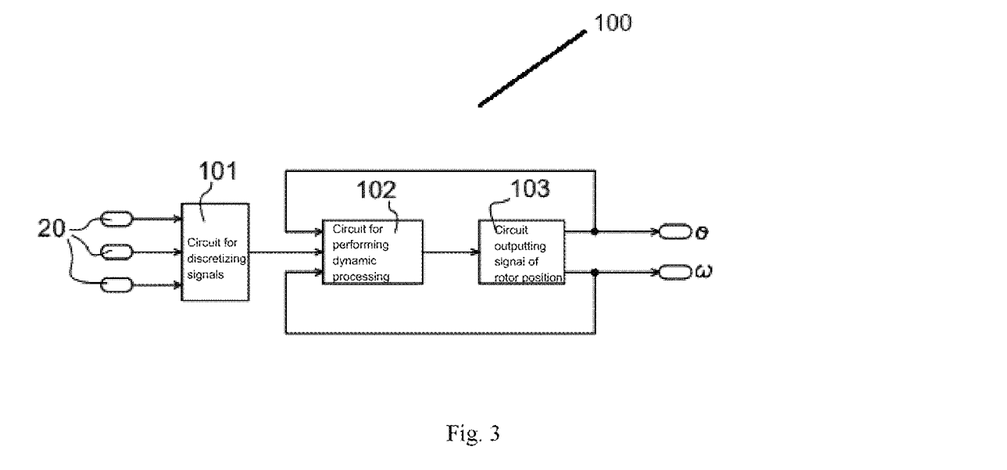
FIG. 3 schematically shows the device for determining the position of the rotor of the machine according to one non-limiting example of implementation of the invention, FIG. 4 schematically shows in detail one example of implementation of the circuit for performing dynamic processing of FIG. 3, FIG. 5 schematically shows one embodiment of a low-pass filter of the circuit for performing dynamic processing of FIG. 4.

It may be seen in FIG. 3 that the circuit 102 for performing dynamic processing also receives as input the two outputs of the circuit 103, namely the signal representative of the position of the rotor 4 and the speed of this rotor 4.

The operation of one example of a circuit 102 for processing an odd-order harmonic will now be described.

A comparison is first made by a block 110 of circuit 102 between the speed of rotation of the rotor 4 of the electric machine, such as estimated by the circuit 103, and a threshold speed of rotation, for example equal to 500 rpm. Below this threshold speed, the circuit is in a first operating range in which its operation is neutralized, as explained below, the output of the circuit 102 corresponding to its input.

Figure 4:
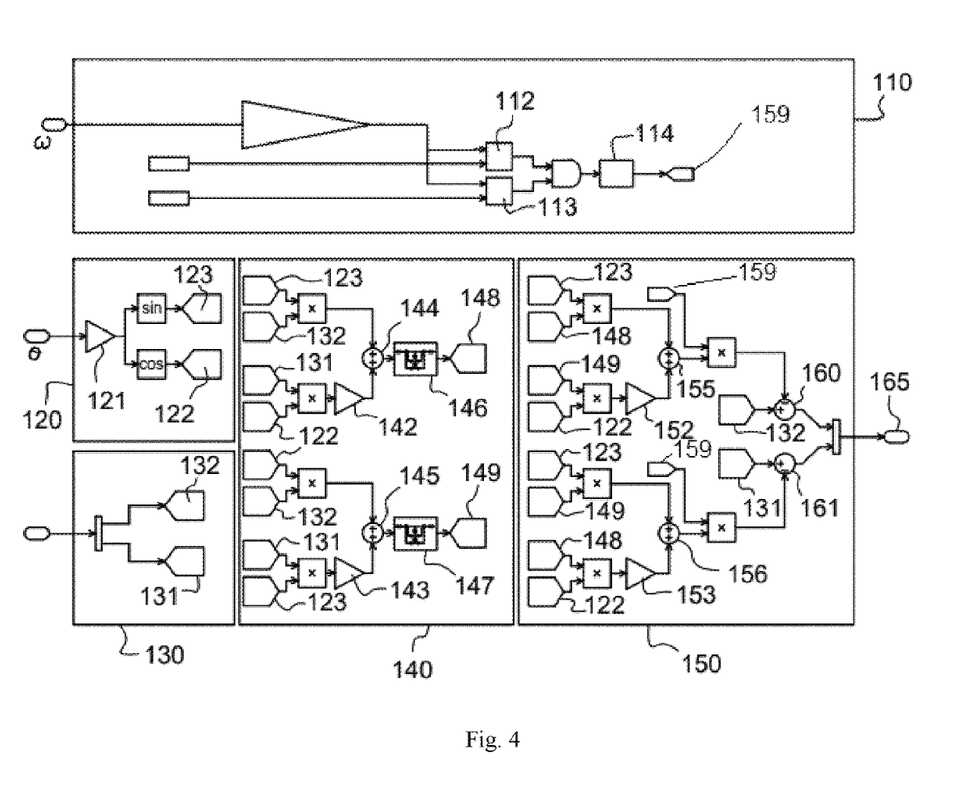
Figure 5:
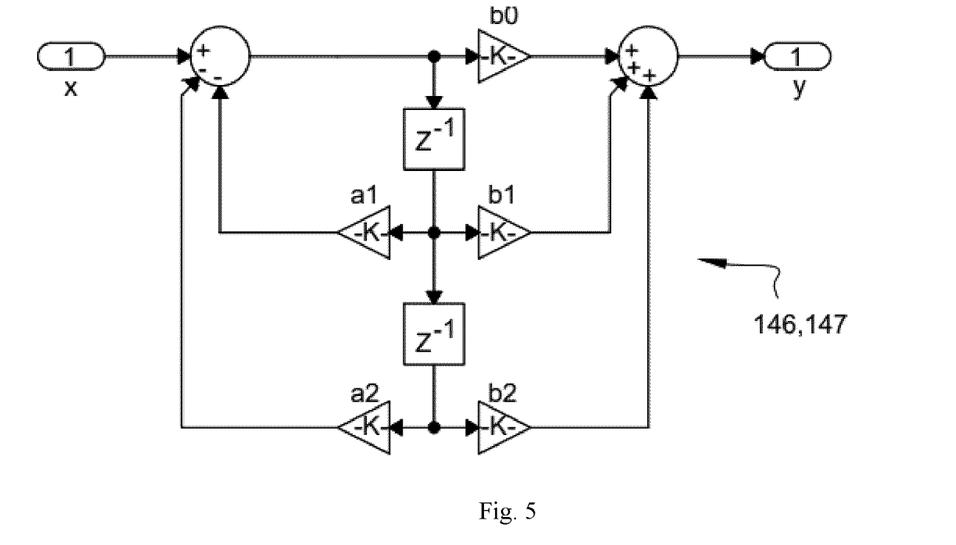

This comparison is shown schematically in FIG. 4 by two comparators 112 and 113. Above this threshold speed, circuit 102 is in a second operating range.

The processing of the odd-order harmonic implements the following steps:
collecting two signals representative of the phase and of the amplitude of this odd-order harmonic for which it is desired to compensate via: synchronous demodulation of the signal resulting from the signals delivered by the position sensors by a reference signal at said harmonic and in phase with the signal representative of the position of the rotor, this reference signal being generated on the basis of the signal representative of the position of the rotor, then low-pass filtering,
reconstructing a signal at said harmonic on the basis of the reference signal at said harmonic in phase with the signal representative of the position of the rotor using each signal representative of phase and amplitude thus generated, and
compensating for said harmonic by subtracting from the signal resulting from the signals delivered by the position sensors the signal at said harmonic thus reconstructed.

More precisely, in the example of FIG. 4, a block 120 that receives as input the angle of rotation of the rotor 4 of the electric machine estimated by the circuit 103 generates a reference signal at this harmonic and in phase with the signal representative of the position of the rotor. To do this, this signal applies to this angle a gain 121 that is an odd integer corresponding to the rank of the harmonic for which it is desired to compensate, for example five, seven or eleven.

A cosine component 122 the frequency of which corresponds to this harmonic and in phase with the signal representative of the position of the rotor, and a sine component 123 the frequency of which corresponds to this harmonic and in phase with the signal representative of the position of the rotor are then generated.

Another block 130 receives as input the signal output by the circuit 101, which corresponds to a signal resulting from the signals delivered by the sensors, and delivers as output the cosine component 131 and the sine component 132 of this signal.

The outputs of these blocks 120 and 130 are then delivered to a block 140 that carries out the step of generating the two signals representative of the amplitude and of the phase of the odd-order harmonic for which it is desired to compensate.

This block 140 here implements four synchronous demodulations, namely:
- synchronous demodulation of the cosine component 131 by the cosine component 122 of the reference signal at said harmonic and in phase with the signal representative of the position of the rotor,
- synchronous demodulation of the cosine component 131 by the sine component 123 of the reference signal at said harmonic and in phase with the signal representative of the position of the rotor,
- synchronous demodulation of the sine component 132 by the sine component 123 of the reference signal at said harmonic and in phase with the signal representative of the position of the rotor, and
- synchronous demodulation of the sine component 132 by the cosine component 122 of the reference signal at said harmonic and in phase with the signal representative of the position of the rotor.

It may be seen in FIG. 3 that a gain 142, which is for example equal to 1 or −1, is applied to the signal resulting from the synchronous demodulation of the cosine component 131 by the cosine component 122 of the reference signal at said harmonic and in phase with the signal representative of the position of the rotor, and that a gain 143, which may also be equal to 1 or −1, is applied to the signal resulting from the synchronous demodulation of the cosine component 131 by the sine component 123 of the reference signal at said harmonic and in phase with the signal representative of the position of the rotor. The value of these gains depends on the value of the order of the harmonic for which it is desired to compensate. For the harmonic of order 5 for example, the gain 142 is equal to −1 and the gain 143 is equal to 1.

Summers 144 and 145 are present, the summer 144 receiving as input:
- the result of the synchronous demodulation of the sine component 132 by the sine component 123 of the reference signal at said harmonic and in phase with the signal representative of the position of the rotor, and
- the signal output by the gain 142, and the summer 145 receiving as input:
- the result of the synchronous demodulation of the sine component 132 by the cosine component 122 of the reference signal at said harmonic and in phase with the signal representative of the position of the rotor, and
- the signal output by the gain 143.

Next, the signal output by the summer 144 is delivered to a first low-pass filter 146 and the signal output by the summer 145 is delivered to a second low-pass filter 147. These two low-pass filters 146 and 147 are for example identical and are both second-order filters. Each of these filters has, for example, a cutoff frequency equal to 50 Hz. These filters for example take the form shown in FIG. 5.

The following are then collected:
- as output from the first filter 146, a signal 148 corresponding to the first signal representative of the phase and of the amplitude of the odd-order harmonic for which it is desired to compensate, and
- as output from the second filter 147, a signal 149 corresponding to the second signal representative of the phase and of the amplitude of the odd-order harmonic for which it is desired to compensate.

A description will now be given, again with reference to FIG. 4, of an example of reconstructing a signal at the odd-order harmonic for which it is desired to compensate. A block 150 performs the following four modulations:
- synchronous modulation of the cosine component 122 of the reference signal at said harmonic and in phase with the signal representative of the position of the rotor by the first representative signal 148,
- synchronous modulation of the sine component 123 of the reference signal at said harmonic and in phase with the signal representative of the position of the rotor by the first representative signal 148,
- the synchronous modulation of the sine component 123 of the reference signal at said harmonic and in phase with the signal representative of the position of the rotor by the second representative signal 149, and
- synchronous modulation of the cosine component 122 of the reference signal at said harmonic and in phase with the signal representative of the position of the rotor by the second representative signal 149.

Similarly to what was described with reference to the block 140, it may be seen in FIG. 3 that a gain 152, which is for example equal to 1 or −1, is applied to the signal resulting from the modulation of the cosine component 122 of the reference signal at said harmonic and in phase with the signal representative of the position of the rotor by the second representative signal 149, and that a gain 153, which may also be equal to 1 or −1, is applied to the signal resulting from the synchronous modulation of the cosine component 122 of the reference signal at said harmonic and in phase with the signal representative of the position of the rotor by the first representative signal 148. The value of these gains depends on the value of the order of the harmonic for which it is desired to compensate. For the harmonic of order 5, the gain 152 is for example equal to 1 and the gain 153 is equal to −1.

This block 140 then produces, via a summer 155, a first linear combination of the output of the gain 152 and of the signal resulting from the synchronous modulation of the sine component 123 of the reference signal at said harmonic and in phase with the signal representative of the position of the rotor by the first representative signal 148, and, via a summer 156, a second linear combination of the output of the gain 153 and of the signal resulting from the synchronous modulation of the sine component 123 of the reference signal at said harmonic and in phase with the signal representative of the position of the rotor by the second representative signal 149.

The two phase and gain components for the two sine and cosine signals at the harmonic for which it is desired to compensate are thus generated.

The block 110 determines at 114 a value for a gain 159 to be applied to the output of the summer 155 and to the output of the summer 156. The value of this gain 159 depends on the operating range in which circuit 102 is located.

When the circuit 102 is in the first operating range, the value of the gain 159 may be zero, so as to neutralize the processing of the odd-order harmonic in question. When circuit 102 is in the second operating range, the value of the gain 159 may be equal to 1.

It is possible to make provision for a transition between the first and second operating ranges, the gain value 159 gradually passing from 0 to 1 for example.

After application of the gain 159, the first linear combination is subtracted from the sine component 132 via an operator 160 and the second linear combination is subtracted from the cosine component 131 via an operator 161.

These two components are then recombined in order to obtain as output from the block 150 a signal 165 the odd-order harmonic of which is considered to have been compensated for.

Figure 6:
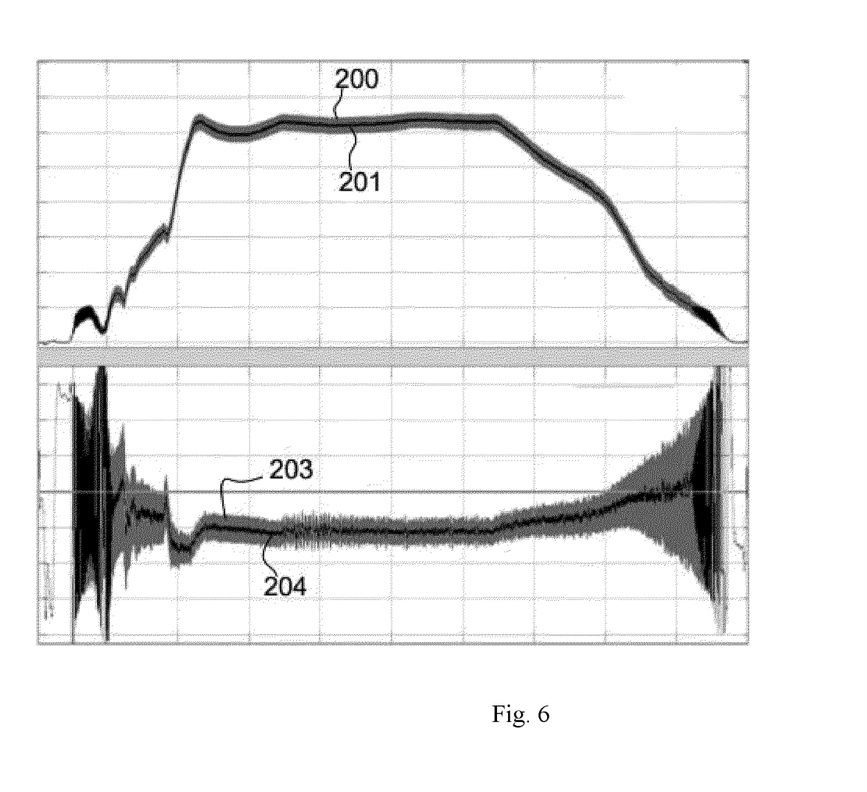
FIG. 6 shows, on a first graph: the estimated speed of the rotor of the electric machine as a function of time in response to a given speed setpoint, with and without processing of the harmonic of order 5 using the device according to one example of implementation of the invention, and, on a second graph: the difference between the actual angular position of the rotor and the position estimated with and without processing of the odd-order harmonic, with the same speed setpoint.

An example highlighting the effect of the invention will now be described with reference to FIG. 6 in the case where it is desired to compensate for the harmonic of order 5.

Curve 200 corresponds to the speed of rotation of the rotor that the circuit 103 would provide in the absence of the circuit 102 for performing dynamic processing according to the invention, and curve 201 corresponds to this speed of rotation output by the circuit 103 when circuit 102 that has just been described is placed upstream of the circuit 103.

Curve 203 corresponds to the error between the rotor position setpoint and the position of this rotor 4 that the circuit 103 would provide in the absence of the circuit 102 for performing dynamic processing according to the invention, and curve 204 corresponds to the same error when the circuit 102 that has just been described is placed upstream of the circuit 103.

The invention is not limited to the example that has just been described.

It is possible for the circuit 102 for performing dynamic processing to continuously compensate for the odd-order harmonic in question, there then being no threshold speed.

Figure 7:
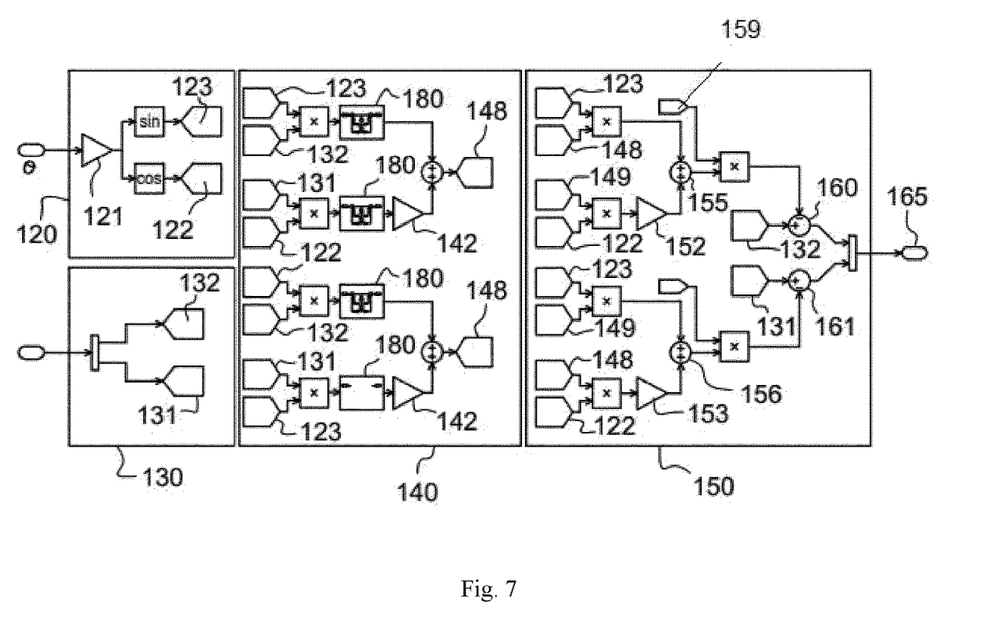
FIGS. 7 to 9 show other variants of the circuit for performing dynamic processing of FIG. 4.
Figure 8:
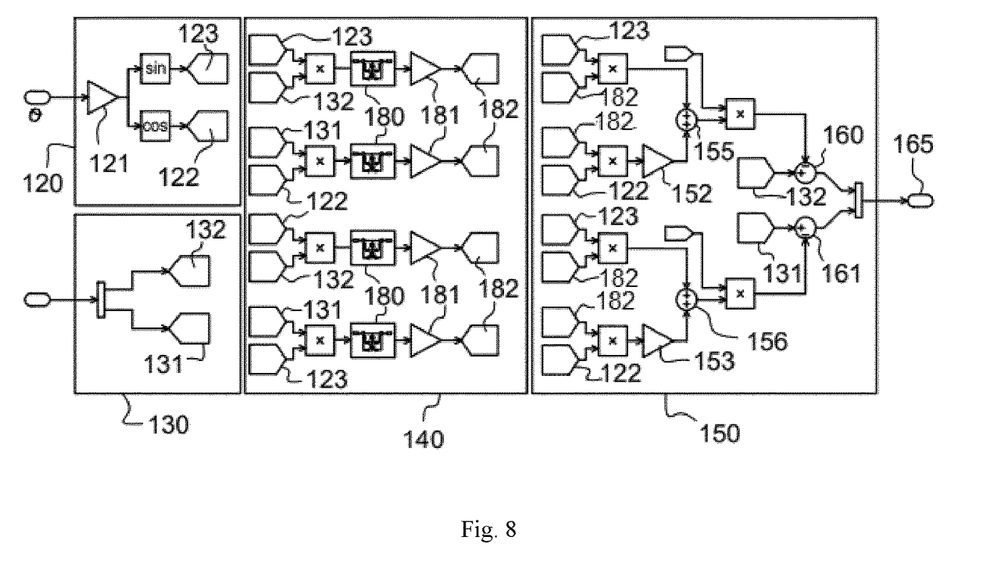
Figure 9:
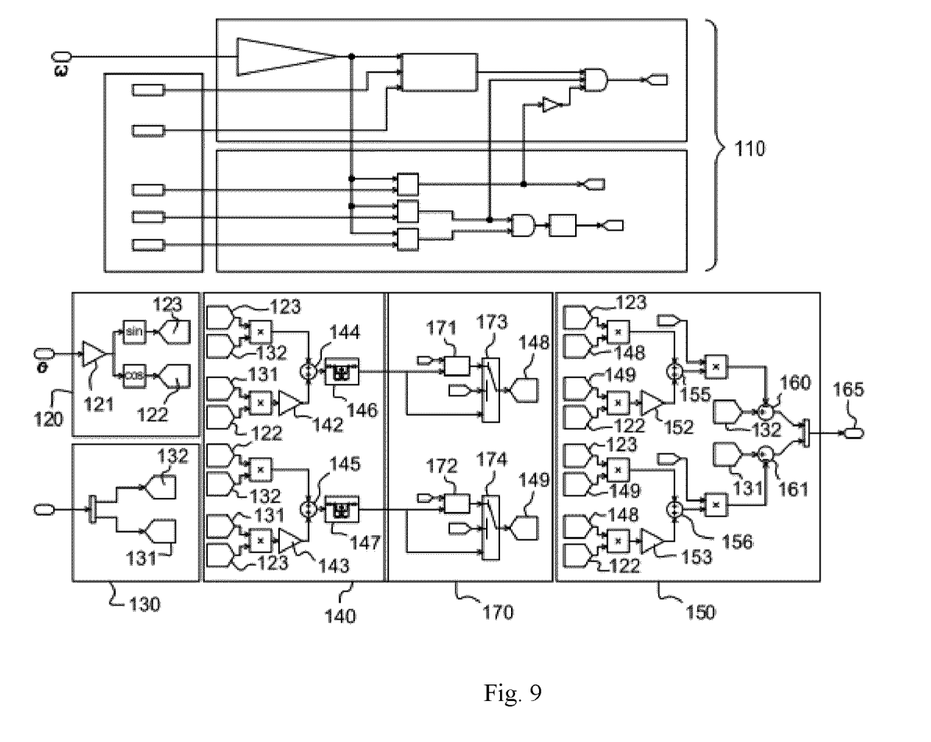

FIGS. 7 to 9 show yet other examples of implementation of the invention.

The example of FIG. 7 differs from that described with reference to FIG. 4 in the number of low-pass filters in block 140. Although two signals 148 and 149 representative of the phase and of the amplitude of the odd-order harmonic for which it is desired to compensate are still generated as output from this block 140, four low-pass filters 180 are provided here, each of these low-pass filters 180 processing the result of one of the four demodulations described with reference to FIG. 4. Two low-pass filters 180 have their output linearly combined to form the first signal 148 representative of the phase and of the amplitude of said harmonic and two other low-pass filters 180 have their output linearly combined to form the second representative signal 149.

The example of FIG. 8 differs from the example described with reference to FIG. 7 in the number of signals representative of the phase and of the amplitude of said odd-order harmonic that are delivered as output from the block 140. The outputs of the low-pass filters 180 are here not linearly combined and each forms, after application of a gain 181, one signal 182 representative of the phase and of the amplitude of the odd-order harmonic for which it is desired to compensate. Each of these representative signals 182 is then used by the block 150 to perform four modulations, similarly to what was described with reference to FIG. 4. One of these representative signals 182 is for example combined with the sine component 123 of the reference signal at said harmonic and in phase with the signal representative of the position of the rotor, another of these representative signals 182 is combined with the sine component 123 of the reference signal at said harmonic and in phase with the signal representative of the position of the rotor, another of these representative signals 182 is combined with the cosine component 122 of the reference signal at said harmonic and in phase with the signal representative of the position of the rotor, and lastly another of these representative signals 182 is combined with the cosine component 122 of the reference signal at said harmonic and in phase with the signal representative of the position of the rotor.

The example of FIG. 9 differs from the example described with reference to FIG. 4 in the additional presence of a block 170 interposed between the block 140 and the block 150 of the circuit 102 of FIG. 4 and in a corresponding modification of the block 110. This block 170 comprises two storage units 171 and 172 and two multiplexers 173 and 174. This block allows the compensation of the odd-order harmonic in question to be modified when the circuit 102 detects that the speed of rotation of the rotor has passed into a predefined speed range. This predefined speed range is here centered on a speed at which this harmonic aliases to the fundamental, for example a speed of 16500 rpm.

As may be seen in FIG. 9, each storage unit 171, 172 is interposed between an output of the block 140 and one input of the multiplexer, another input of which is directly connected to the output of block 140.

When the speed of rotation of the rotor is outside the predefined speed range, each storage unit 171, 172 stores the values of the signal output by the corresponding block 140 and these values are delivered as input to the multiplexer 173, 174 and used as first representative signal 148 and second representative signal 149 in the block 150. When the speed of rotation of the rotor 4 of the electric machine passes into the predefined range of values, the block 110 sends to the storage units 171, 172 the instruction to no longer store the values of the corresponding signal output by the block 140 and modifies the configuration of the multiplexer 173, 174 such that:

the signals output by the block 140 are no longer transmitted to the block 150, the values stored in the storage units 171, 172 are transmitted to the block 150 and used to reconstruct the signal at said harmonic and therefore to compensate for this harmonic.

When the block 110 detects that the speed of rotor 4 has left the predefined speed range, the configuration of the multiplexers 173 and 174 is modified again, such that the signals output by the block 140 are again transmitted to the block 150. Moreover, the values of these signals output by block 140 are again stored in the corresponding storage unit 171, 172.

The block 170 that has just been described with reference to FIG. 9 may also be present in the examples of FIGS. 7 and 8.

The invention claimed is:

1. A device for determining an angular position of a rotor of a rotary electric machine based on signals delivered by a plurality of position sensors, the device comprising:
  a circuit for estimating a position of the rotor via application of a control loop, the circuit for estimating the position of the rotor delivering as output a signal representative of the position of the rotor, and
  at least one circuit for performing dynamic processing of an odd-order harmonic of a signal resulting from the signals delivered by the plurality of position sensors, the circuit for performing dynamic processing receiving as input:
    the signal resulting from the signals delivered by the position sensors, and
    the signal representative of the position of the rotor,
  the circuit for performing dynamic processing being placed upstream of the circuit for estimating the position of the rotor, and the circuit for performing dynamic processing being configured to:
  generate at least two signals representative of a phase and of an amplitude of an odd-order harmonic for which it is desired to compensate, via:
    synchronous demodulation of the signal resulting from the signals delivered by the position sensors by a reference signal at said harmonic and in phase with the signal representative of the position of the rotor, said reference signal being generated based on the signal representative of the position of the rotor, and low-pass filtering, reconstruct a signal at said harmonic on the basis of the reference signal at said harmonic in phase with the signal representative of the position of the rotor and using the signals representative of phase and amplitude thus generated via synchronous modulation, and compensate for said harmonic by subtracting from the signal resulting from the signals delivered by the position sensors the signal at said harmonic thus reconstructed.

2. The device as claimed in claim 1, wherein the circuit for performing dynamic processing processes said harmonic only above a threshold speed of the rotor of the electric machine.

3. The device as claimed in claim 2, wherein the circuit for performing dynamic processing has two operating ranges: a first operating range corresponding to speeds below the threshold speed and being characterized by non-compensation for said harmonic, and a second operating range corresponding to speeds above the threshold value, a transition being implemented on passage from the first to the second operating mode.

4. The device as claimed in claim 1, wherein the signal resulting from the signals delivered by the position sensors has a cosine component and a sine component, and wherein the synchronous demodulation consists in performing the following four demodulations:

the cosine component by the cosine component of the reference signal at said harmonic and in phase with the signal representative of the position of the rotor, the cosine component by the sine component of the reference signal at said harmonic and in phase with the signal representative of the position of the rotor, the sine component by the sine component of the reference signal at said harmonic and in phase with the signal representative of the position of the rotor, and the sine component by the cosine component of the reference signal at said harmonic and in phase with the signal representative of the position of the rotor.

5. The device as claimed in claim 4, wherein the signals representative of the phase and of the amplitude of the harmonic for which it is desired to compensate are generated by applying a first low-pass filter to a linear combination of two results of the four aforementioned demodulations and by applying a second low-pass filter to a linear combination of the other two results of the four aforementioned demodulations, the first and second low-pass filters being identical.

6. The device as claimed in claim 4, wherein reconstructing a signal at said harmonic comprises the step of performing the following four modulations:

the cosine component of the reference signal at said harmonic and in phase with the signal representative of the position of the rotor by the first signal representative of the phase and of the amplitude of the harmonic for which it is desired to compensate, the sine component of the reference signal at said harmonic and in phase with the signal representative of the position of the rotor by the first signal representative of the phase and of the amplitude of the harmonic for which it is desired to compensate, the sine component of the reference signal at said harmonic and in phase with the signal representative of the position of the rotor by the second representative of the phase and of the amplitude of the harmonic for which it is desired to compensate, and the cosine component of the reference signal at said harmonic and in phase with the signal representative of the position of the rotor by the second signal representative of the phase and of the amplitude of the harmonic for which it is desired to compensate.

7. The device as claimed in claim 6, wherein reconstructing the signal at said harmonic comprises the step of obtaining a first linear combination of the result of two of the four aforementioned modulations and a second linear combination of the result of the other two of the four aforementioned modulations.

8. The device as claimed in claim 7, wherein said harmonic is compensated for by subtracting from the cosine component of the signal resulting from the signals delivered by the position sensors one of the first and second linear combinations and by subtracting from the sine component of the signal resulting from the signals delivered by the position sensors the other of the first and second linear combinations.

9. The device as claimed in claim 1, wherein the circuit for performing dynamic processing of the odd-order harmonic comprises a storage unit for storing values of the signals representative of the phase and of the amplitude of the odd-order harmonic for which it is desired to compensate and, when the speed of the rotor of the electric machine passes into a predefined range of values, the signal at said harmonic is reconstructed using the values of these representative signals stored in the storage unit before the speed of the rotor passes into said range of values.

10. An assembly comprising:
a rotary electric machine for driving a hybrid or electric vehicle, and
a device for controlling this electric machine, comprising a determining device as claimed in claim 1.

11. A method comprising:
determining an angular position of a rotor of a rotary electric machine based on signals delivered by a plurality of position sensors using a determining device as claimed in claim 1.

12. The device as claimed in claim 2, wherein the signal resulting from the signals delivered by the position sensors has a cosine component and a sine component, and wherein the synchronous demodulation consists in performing the following four demodulations:

the cosine component by the cosine component of the reference signal at said harmonic and in phase with the signal representative of the position of the rotor, the cosine component by the sine component of the reference signal at said harmonic and in phase with the signal representative of the position of the rotor, the sine component by the sine component of the reference signal at said harmonic and in phase with the signal representative of the position of the rotor, and the sine component by the cosine component of the reference signal at said harmonic and in phase with the signal representative of the position of the rotor.

13. The device as claimed in claim 5, wherein reconstructing a signal at said harmonic comprises the step of performing the following four modulations:

the cosine component of the reference signal at said harmonic and in phase with the signal representative of the position of the rotor by the first signal representative of the phase and of the amplitude of the harmonic for which it is desired to compensate, the sine component of the reference signal at said harmonic and in phase with the signal representative of the position of the rotor by the first signal representative of the phase and of the amplitude of the harmonic for which it is desired to compensate, the sine component of the reference signal at said harmonic and in phase with the signal representative of the position of the rotor by the second representative of the phase and of the amplitude of the harmonic for which it is desired to compensate, and the cosine component of the reference signal at said harmonic and in phase with the signal representative of the position of the rotor by the second signal representative of the phase and of the amplitude of the harmonic for which it is desired to compensate.

14. The device as claimed in claim 2, wherein the circuit for performing dynamic processing of the odd-order harmonic comprises a storage unit for storing values of the signals representative of the phase and of the amplitude of the odd-order harmonic for which it is desired to compensate and, when the speed of the rotor of the electric machine passes into a predefined range of values, the signal at said harmonic is reconstructed using the values of these representative signals stored in the storage unit before the speed of the rotor passes into said range of values.

15. An assembly comprising:
a rotary electric machine for driving a hybrid or electric vehicle, and
a device for controlling this electric machine, comprising a determining device as claimed in claim 2.

16. A method for comprising:
determining an angular position of a rotor of a rotary electric machine based on signals delivered by a plurality of position sensors using a determining device as claimed in claim 2.

17. The device as claimed in claim 3, wherein the signal resulting from the signals delivered by the position sensors has a cosine component and a sine component, and wherein the synchronous demodulation consists in performing the following four demodulations:

the cosine component by the cosine component of the reference signal at said harmonic and in phase with the signal representative of the position of the rotor, the cosine component by the sine component of the reference signal at said harmonic and in phase with the signal representative of the position of the rotor, the sine component by the sine component of the reference signal at said harmonic and in phase with the signal representative of the position of the rotor, and the sine component by the cosine component of the reference signal at said harmonic and in phase with the signal representative of the position of the rotor.

18. The device as claimed in claim 3, wherein the circuit for performing dynamic processing of the odd-order harmonic comprises a storage unit for storing values of the signals representative of the phase and of the amplitude of the odd-order harmonic for which it is desired to compensate and, when the speed of the rotor of the electric machine passes into a predefined range of values, the signal at said harmonic is reconstructed using the values of these representative signals stored in the storage unit before the speed of the rotor passes into said range of values.

19. An assembly comprising:
a rotary electric machine for driving a hybrid or electric vehicle, and
a device for controlling this electric machine, comprising a determining device as claimed in claim 3.

20. A method comprising:
determining an angular position of a rotor of a rotary electric machine based on signals delivered by a plurality of position sensors using a determining device as claimed in claim 3.

* * * * *